J. W. RIKMAR & J. DE M. ROBINSON.
NON-SKID TIRE SHOE.
APPLICATION FILED MAR. 9, 1915.

1,147,549.

Patented July 20, 1915.

Witnesses
J. P. Appleman
J. Stanley Burch

Inventors
J. W. Rikmar
J. De M. Robinson

By T. K. Bryant,
Attorney.

UNITED STATES PATENT OFFICE.

JOHN WILLIAM RIKMAR AND JOSEPHINE DE MOTT ROBINSON, OF HEMPSTEAD, NEW YORK.

NON-SKID TIRE-SHOE.

1,147,549.   Specification of Letters Patent.   Patented July 20, 1915.

Application filed March 9, 1915. Serial No. 13,105.

*To all whom it may concern:*

Be it known that we, JOHN WILLIAM RIKMAR and JOSEPHINE DE MOTT ROBINSON, citizens of the United States of America, residing at Hempstead, in the county of Nassau and State of New York, have invented certain new and useful Improvements in Non-Skid Tire-Shoes, of which the following is a specification.

This invention relates to new and useful improvements in non-skid tire shoes.

The primary object of this invention is to provide a removable shoe adapted to be easily applied to the tire of a wheel of vehicles such as automobiles and the like for the purpose of preventing side slipping and skidding of the vehicle as well as to afford greater traction properties and assisting the vehicle in running over roads covered with mud, ice and snow.

A further object of the device is to provide a two-part shoe easily clamped to the periphery of a pneumatic tire and having both transverse and longitudinal rib calks and adapted to provide laterally projecting surfaces for assisting to support the wheel when passing over soft surfaces by preventing the wheel from sinking into the same.

A still further object of the device is to provide a removable clamping shoe for an automobile tire serviceable after the manner of the caterpillar tread devices and not only preventing the carrying wheel from sinking into the mud or soft surface of the roadbed, but also imparting means for preventing lateral movements of the wheel and affording a better grip upon the road bed.

With these general objects in view and others that will appear as the nature of the invention is better understood, the same consists in the novel combination and arrangement of parts hereinafter fully described, illustrated in the accompanying drawings and pointed out in the appended claims.

Figure 1:
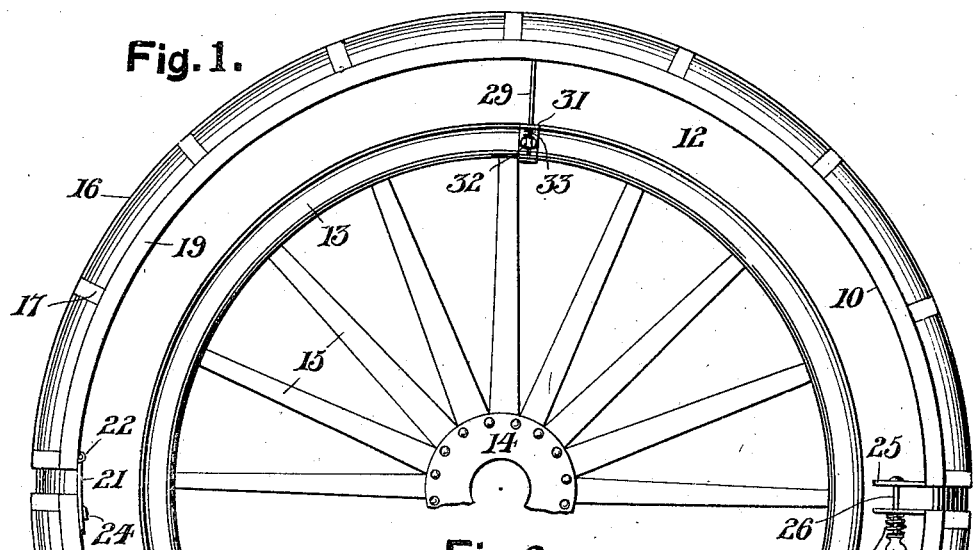
Figure 2:
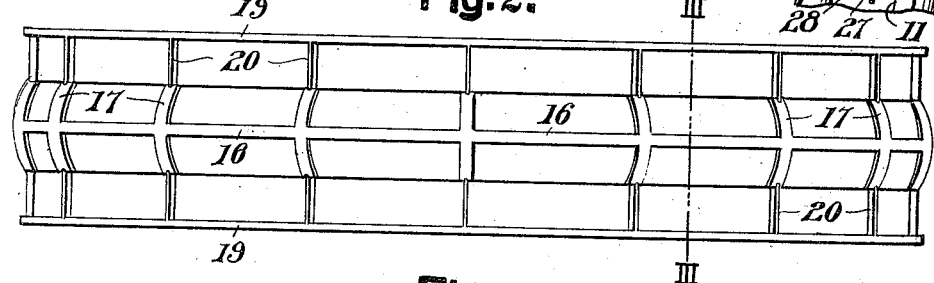
Figure 3:
Figure 4:
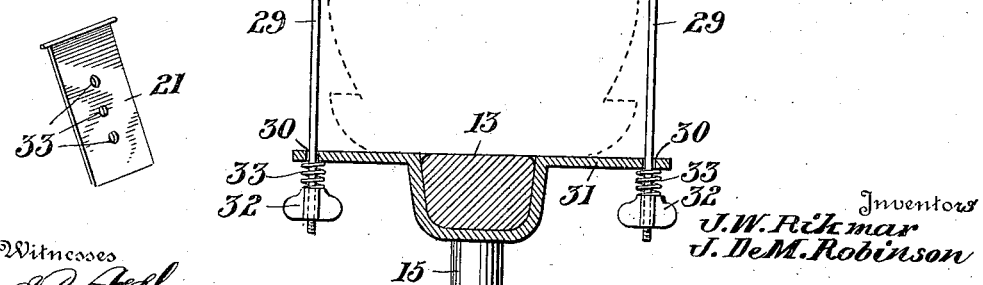

In the drawings forming a part of this application and in which like designating characters refer to corresponding parts throughout the several views:—Figure 1 is a side elevation of substantially one-half of a wheel illustrating the present device clamped upon the tread portion of the tire thereof. Fig. 2 is a top plan view of the same. Fig. 3 is a transverse sectional view taken upon line III—III of Fig. 2, and Fig. 4 is a perspective view of one of the pivoted hinge plates detached.

Referring more in detail to the drawings, it will be seen that the entire invention broadly consists of the provision of two identically formed shoe sections 10 and 11 substantially semi-circular in shape and adapted to be mounted upon the tread portion of a pneumatic tire such as 12, which tire is herein illustrated as supported upon the felly 13 of a wheel having a hub 14 and spokes 15. The said shoe sections are formed of a central rib 16 positionable centrally of the periphery of the wheel tire and having lateral ribs 17 spaced apart and of equal length and extending therefrom, the said central and lateral ribs being formed either of metal, hard rubber, or other desired material and when taken together, form the central rib portion of the device. Lateral or side plates 18 are positioned in alinement and spaced apart and connected by the lateral ribs 17, the said ribs and plates being herein shown metallic. The plates 18 are provided with angularly projecting marginal flanges 19 upon their outer edges while transverse calk flanges 20 are carried by the outer faces of the plates 18 transversely thereof and engaging with and being of the same height as the aforementioned flanges 19, it being also noted that the calk flanges 20 correspond in numbers and merge centrally with the lateral ribs 17 which are of slightly less height than the said flanges.

The section 10 is provided with a hook plate 21 pivoted thereto as at 22 and provided with perforations 23 for engaging over a hook 24 carried by the adjacent end of the section 11, it being understood that such hook plate and hook are carried on the under sides of each pair of the plates 18 of the respective shoe sections. The said plates 18 at the ends thereof opposite their ends which carry the said hook members are provided with inwardly projecting radial lugs 25 through which a bolt 26 extends having a lock nut 27 screwed upon one end thereof and provided with an encircling tensioning spring 28 and all of which forms a resilient clamping means between the said ends of the sections. Further clamping means may also be provided as best illustrated in Fig. 3, the same consisting of rods 29 carried by the plates 18 and extending radially inward and passing through perforations 30 in a yoke 31 which is positioned upon the inner side of the felly 13, while winged nuts 32 are threaded upon the free ends of the said rods 29 and springs 33 are positioned between the said winged nuts and the yoke 31.

It will be understood that one or more of the rod clamping means just described may be provided with each section, one only of the same being herein illustrated positioned substantially centrally of the section 10.

With this detailed description of the device it will be seen that when the shoe is mounted upon the wheel tire as illustrated in Fig. 1, the same may be readily removed therefrom by deflating the tire and unhooking the plates 21 from their hooks 24 and by slightly releasing the lock nuts 27 and also by removing the yokes 31 when such yokes are employed.

The manner of applying the device to the tire of an automobile wheel will be at once apparent from the within description.

It will thus be seen that when a vehicle has the wheels thereof provided with the present device, the same may safely pass over slippery roadways without fear of sliding or skidding, while it may also run over soft or swampy ground and the weight of the vehicle will be supported by the side plates 18 of the shoes. The calk flanges 20 as well as the lateral ribs 19 afford traction means for the wheel while the central rib 16 as well as the edge flanges 19 prevent any side slipping or skidding.

While the form of the invention herein shown and described is what is believed to be the preferred embodiment thereof, it is nevertheless to be understood that minor changes may be made in the form, proportion and details of construction without departing from the spirit and scope of the invention as set forth in the appended claims.

What is claimed as new and desired to be secured by Letters Patent of the United States is:—

1. A device of the class described comprising a non-skid element consisting of a longitudinal central rib, spaced apart lateral ribs projecting from said central rib, and side plates oppositely carried by the outer ends of the said lateral ribs.

2. A device of the class described comprising a non-skid element consisting of a longitudinal central rib, spaced apart lateral ribs projecting from said central rib, side plates oppositely carried by the outer ends of the said lateral ribs, marginal angularly projecting calk flanges carried by the said plates, and transverse angularly projecting calk flanges carried by the said plates of the same height and engaging the said marginal flanges thereof, the said transverse flanges being in alinement and merging with the said lateral ribs.

3. A non-skid shoe formed of two similar sections, each of the said sections comprising a non-skid element consisting of a longitudinal central rib, spaced apart lateral ribs projecting from and being of the same thickness as said central rib, side plates oppositely carried by the outer ends of the said lateral ribs, marginal angularly projecting calk flanges carried by the said plates, and being of greater height than the thickness of the said ribs.

4. An auxiliary tire shoe comprising two substantially semi-circular sections, each of the said sections having a central tire-engaging rib portion, lateral oppositely-arranged plates carried by the said central portion, connecting means for the said sections, marginal angularly projecting flanges upon the said plates, and transverse calk flanges upon the said plates integral with and corresponding in height to the said marginal flanges and merging with and being of greater height than the thickness of the said central portion.

In testimony whereof we affix our signatures in presence of two witnesses.

J. WILLIAM RIKMAR.
JOSEPHINE DE MOTT ROBINSON.

Witnesses:
H. WILLARD GRIFFITHS,
ETHEL M. HELD.

Copies of this patent may be obtained for five cents each, by addressing the "Commissioner of Patents, Washington, D. C."